United States Patent [19]

Barr

[11] Patent Number: 5,129,152

[45] Date of Patent: Jul. 14, 1992

[54] FAST CONTACT MEASURING MACHINE

[75] Inventor: John R. Barr, Yorba Linda, Calif.

[73] Assignee: Hughes Aircraft Company, Los Angeles, Calif.

[21] Appl. No.: 630,577

[22] Filed: Dec. 20, 1990

[51] Int. Cl.$^5$ ............................................. G01B 7/28
[52] U.S. Cl. ...................................... 33/503; 33/556; 33/558.03; 33/832
[58] Field of Search ............ 33/503, 504, 556, 558.03, 33/559, 558, 561, 832, 539, 783

[56] References Cited

U.S. PATENT DOCUMENTS

| | | | |
|---|---|---|---|
| 3,234,655 | 2/1966 | Skeels et al. | 33/556 |
| 3,483,626 | 12/1969 | Huttel | 33/783 |
| 3,688,411 | 9/1972 | Asano et al. | 33/783 |
| 3,869,799 | 3/1975 | Neuer et al. | 33/503 |
| 3,936,946 | 2/1976 | Ruffner et al. | 33/556 |
| 4,012,991 | 3/1977 | Uyeda | 33/539 |
| 4,875,294 | 10/1989 | Jefferson | 33/539 |
| 4,891,889 | 1/1990 | Tomelleri | 33/503 |
| 4,892,407 | 1/1990 | McMurtry et al. | 33/503 |
| 4,945,651 | 8/1990 | Georg | 33/832 |

OTHER PUBLICATIONS

Brochure (16 sheets) "Sip 305M Gage Measuring Center" by Societe Genevoise D'Instruments de Physique, American Sip Corporation, Brochure No. 1543, ITG 7604.60.

Brochure (32 sheets) "Heidenhain Metro" May 1987, by Dr. Johannes Heidenhain GmbH, MXM Corp., Brochure 208 464 22.60.5/87 NEW943.

"Engineering Metrology" by K. J. Hume, MacDonald & Co. (Publishers) Ltd., London, 1950, Title Page and Reverse Side, pp. 250 and 255-259.

Primary Examiner—William A. Cuchlinski, Jr.
Assistant Examiner—C. W. Fulton
Attorney, Agent, or Firm—M. E. Lachman; W. J. Streeter; W. K. Denson-Low

[57] ABSTRACT

A pair of anvils (50,54) are respectively fixed to and movable with respect to a base (12). Each anvil has a surface (52,56) of given topography, preferably a flat surface. The surfaces are spaced in parallel from one another at an initial gap so that the anvil surfaces do not contact one another. The movable anvil (50) can be moved away from the fixed anvil (54), such as by a cam (44) and follower (38), and the surfaces are maintained in parallel preferably by a parallelogram constant force flexure assembly (26). The cam is set to maintain a minimum space between the surfaces and to protect them from damage, in the event the movable anvil were accidently dropped towards the non-movable anvil. Parallelism between the surfaces is initially established preferably by an adjustment mechanism comprising a trivet/turnbuckle assembly (58). A displacement transducer (22) is coupled to the movable anvil for measuring the gap as determined by the thickness of a gage or product placed between the surfaces of the anvils. By orienting the movable anvil above the stationary anvil, gravity can be used to urge the movable anvil into contact with the gage or product.

9 Claims, 3 Drawing Sheets

FAST CONTACT MEASURING MACHINE

BACKGROUND OF THE INVENTION

1. Field of the Invention

The present invention relates to measuring machines and, more particularly, to such machines which are capable of quickly and accurately measuring the size of dimensionally controlled gages and like articles.

2. Description of Related Art

Upon purchase and after use of dimensionally controlled gages or after production of a product, such gages and products must be accurately calibrated, inspected, or subjected to process control or match fit selection with accuracy to confirm that they are or remain within tolerance. Machines for measuring the size of gages or such products as cylinders, spheres, wires, connector pins, drills, milling machine cutter tools, flat items and the like, are well known in the industry.

While these existing machines operate very well, they are expensive and are not necessarily amenable to speedy and easy use. Some machines include and thus require the use of expensive and time-consuming spring loaded nulling with a precision positioning mechanism such as a lead screw, and expensive bearings and rails. Other machines have insufficient stiffness to allow the unit under test to be sufficiently wrung between its anvils with sufficient force as to obtain microinch accuracies. Often, the surfaces which contact the gage or product specimen to be measured, come into contact with each other, which potentially can damage the contacting surfaces.

SUMMARY OF THE INVENTION

These and other problems are successfully addressed and overcome by the present invention. A pair of anvils, between which the gage or product is to be positioned, are respectively fixed to and movable with respect to a base. Each anvil has a surface of given topography, preferably a flat surface, and the surfaces are spaced in parallel from one another when they are the closest together at an initial gap so that the anvil surfaces cannot contact one another. The movable anvil can be moved away from the fixed anvil, such as by a cam and follower, which also establish the initial gap, and the surfaces are maintained in parallel preferably by a parallelogram constant force flexure assembly. Prior to use of the invention for taking measurements, parallelism between the surfaces is initially established preferably by a trivet/turnbuckle assembly. A measuring instrument is coupled to the movable anvil for measuring the gap as determined by the thickness of a gage or product or other specimen placed between the surfaces of the anvils. By orienting the movable anvil above the stationary anvil, gravity can be used to urge the movable anvil into contact with the gage or product.

Several advantages are derived from this arrangement. Its use is very quick. The fast contact measuring machine embodied in the present invention is relatively inexpensive. Accuracy is maintained by avoiding contact between the anvil surfaces, which also can be easily cleaned. The use of gravity to bring the anvil surfaces into close proximity to one another avoids the use of springs and other biasing devices. Maintainability of parallelism between the separated specimen-contacting surfaces by the parallelogram constant force flexure assembly avoids the need for such expensive alignment mechanisms as bearings and rails. Alignment between the surfaces is readily obtained with a minimum of effort. Thermal and geometric sources of error are minimized. Repeatability of use is within ±2 microinches (0.05 micron).

Other aims and advantages, as well as a more complete understanding of the present invention, will appear from the following explanation of an exemplary embodiment and the accompanying drawings thereof.

DETAILED DESCRIPTION OF THE PREFERRED EMBODIMENT

Figure 1:
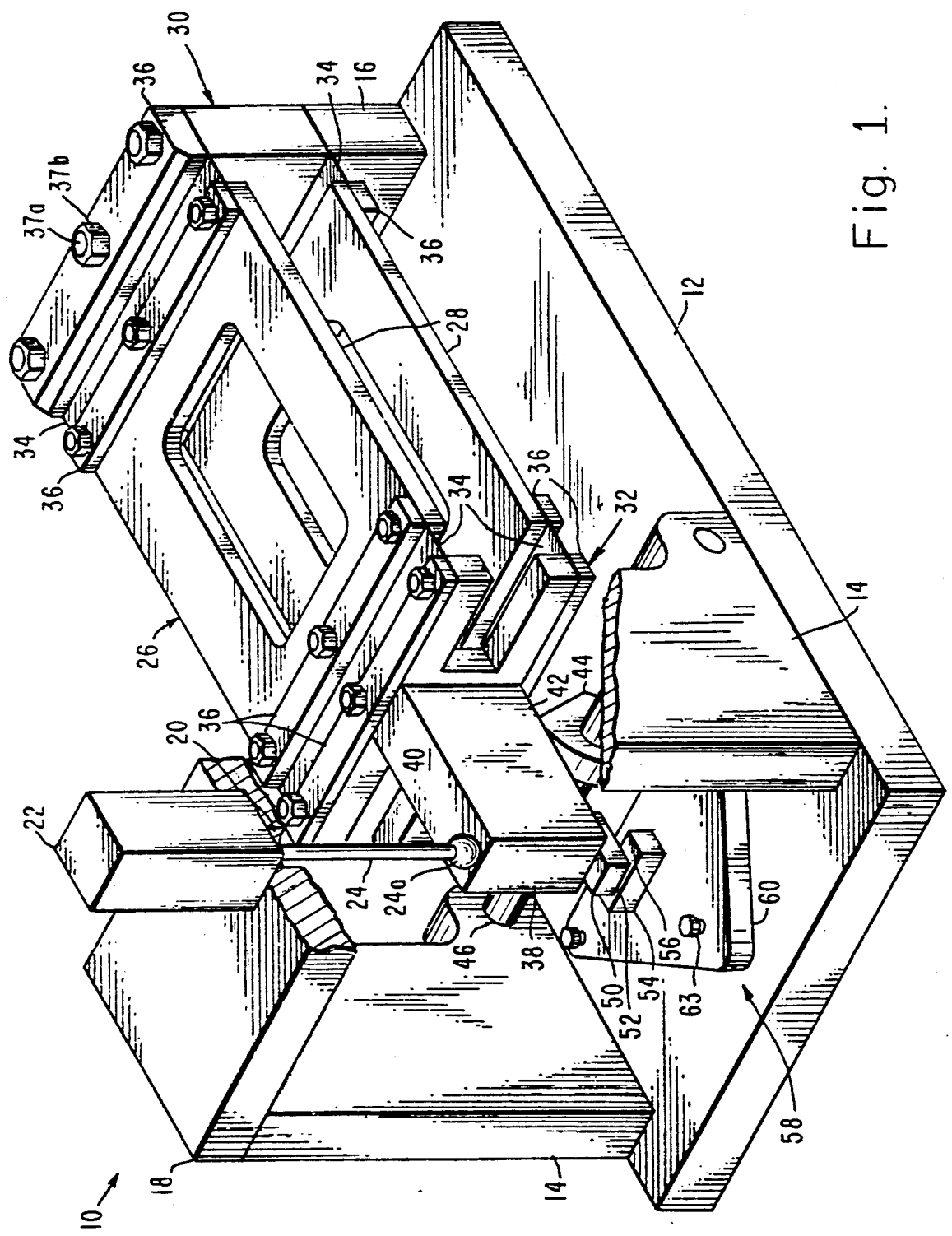
FIG. 1 is perspective view of a fast contact measuring machine depicting a preferred embodiment of the present invention.

Referring to all FIGS. 1-4, a fast contact measuring machine 10 is mounted on a base 12 to which a pair of front supports 14 and a rear support 16 are affixed. A mounting plate 18, having a centrally positioned hole 20, is secured to front supports 14. A displacement transducer 22 with a linearly movable shaft 24 is securely mounted on plate 18 so that transducer shaft 24 extends downwardly through hole 20. Vertical movement of shaft 24 is recorded in displacement transducer 22, such as in microns of linear movement.

A parallelogram constant force flexure assembly 26 is secured to base 12 by support 16 in a cantilevered fashion. Flexure assembly 26 includes a pair of parallely positioned spring flexure holders or struts 28 which are secured to a rear spring retainer 30 and a front spring retainer 32 by four flexure strips 34 formed preferably of flat stainless steel spring. Spring strips 34 are secured to retainers 30 and 32 and to struts 28 in any convenient manner, such as by being clamped by bars 36 which are bolted or screwed or otherwise affixed to their respective parts, e.g., by bolts 37a and nuts 37b. Rear spring retainer 30 is attached to base 12 by support 16 while front spring retainer 32 is spaced from and held above base 12. At rear spring retainer 30, bolts 37a may be extended into base 12 to secure the rear assembly of bar 36, both flexure strips 34, spring retainer 30, support 16 and base 12 together as a unit.

A follower 38 is secured to and extends forwardly from front spring retainer 32 and has upwardly and downwardly facing forward surfaces 40 and 42. Transducer shaft 24 is terminated by a ball 24a to provide an essentially point contact with surface 40, while surface 42 rests on a cam 44. Cam 44 is fixedly mounted on a shaft 46 which, in turn, is rotatably mounted in supports 14. A knurled knob 48 (see FIG. 2), or handle if desired, is secured to an end of shaft 46, which extends from one of supports 14, and enables cam 44 to be rotated and follower 38 to be upwardly moved. Because of the parallelogram configuration of flexure 26, follower surfaces 40 and 42 move parallel to base 12.

Figure 2:
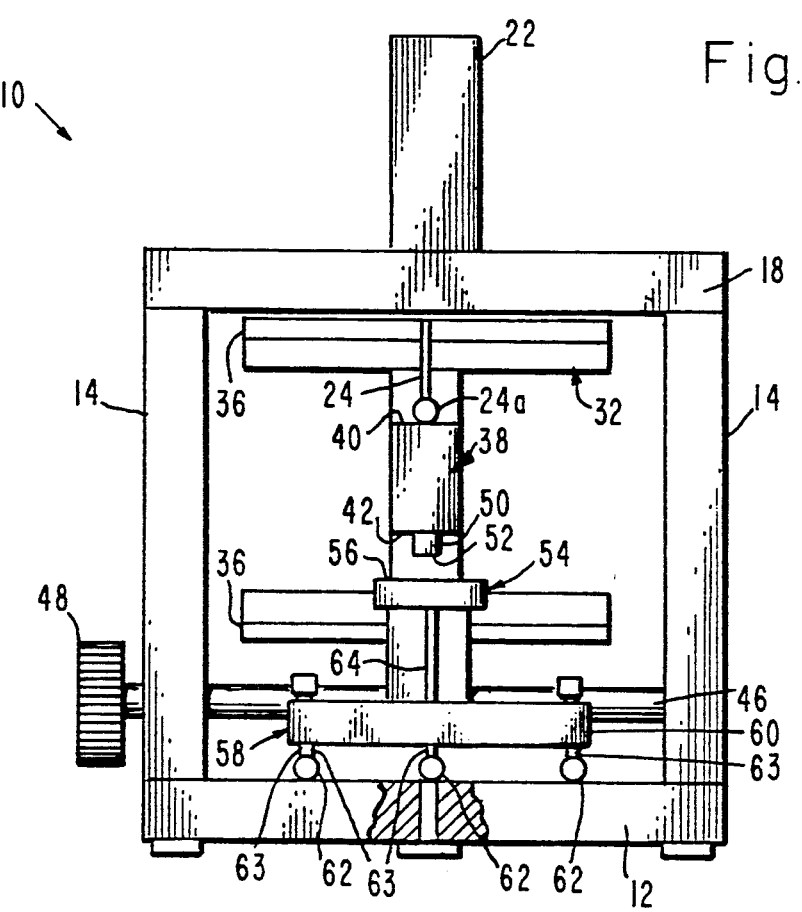
FIG. 2 is front view of the machine illustrated in FIG. 1.
Figure 3:
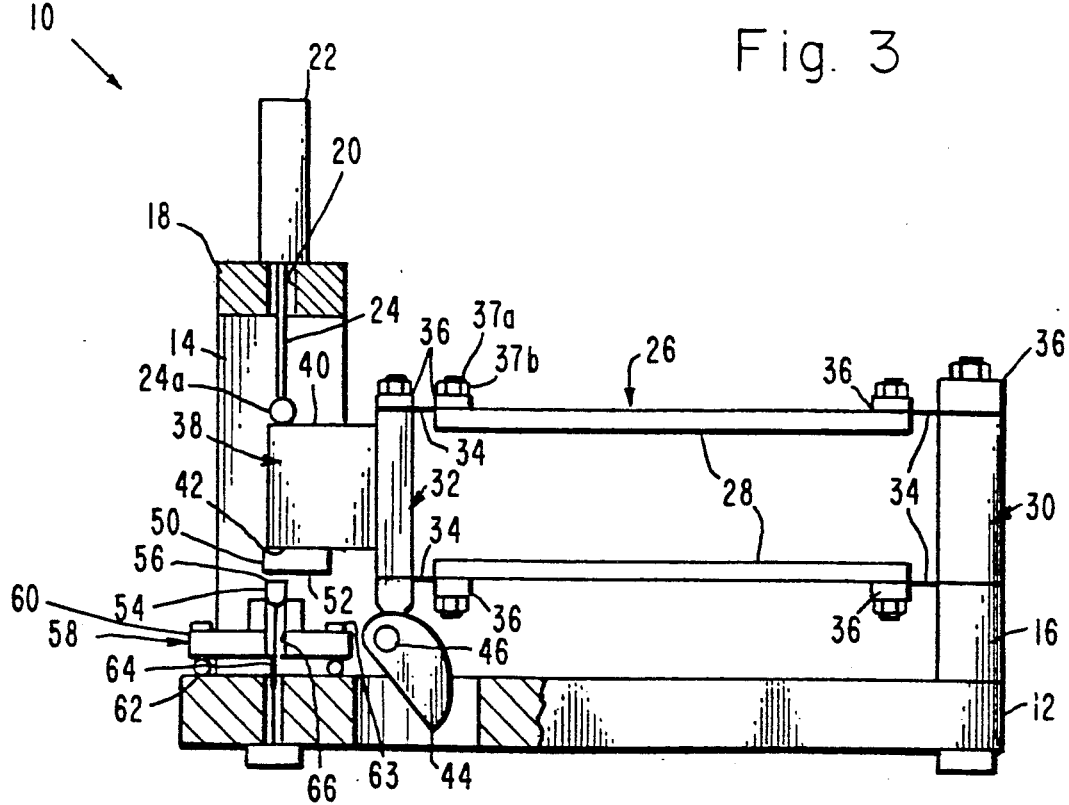
FIG. 3 is side view of the machine depicted in FIG. 1.
Figure 4:
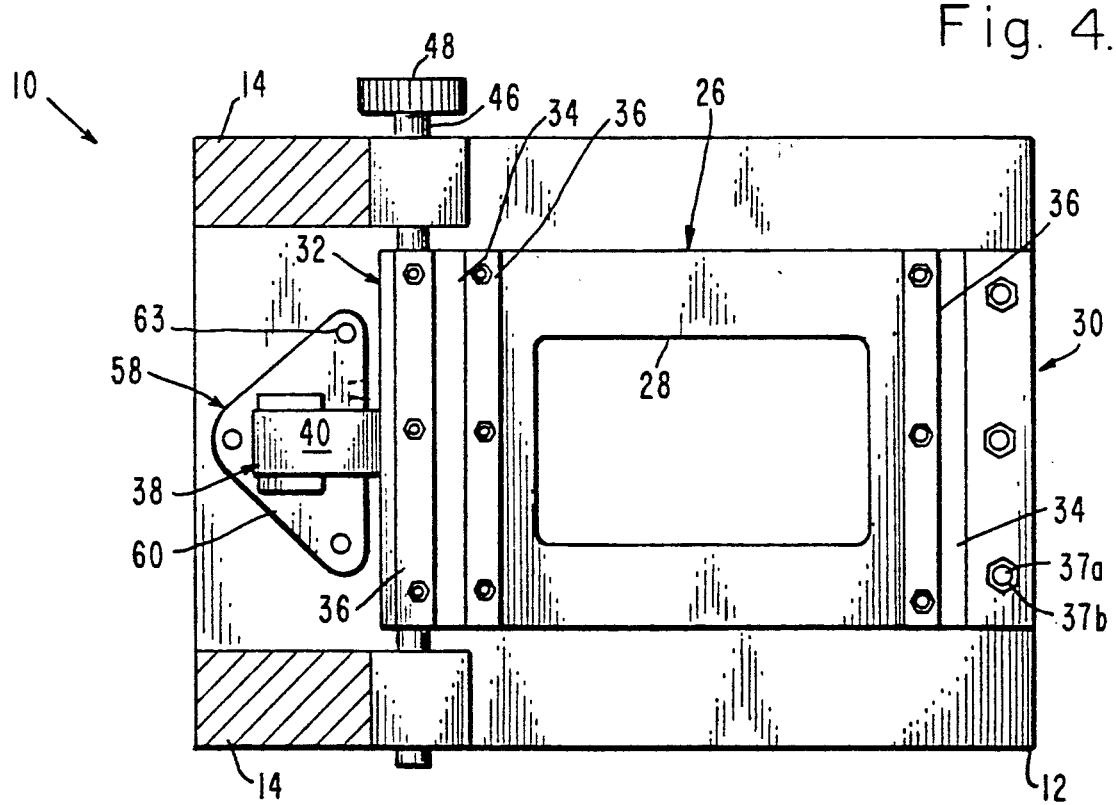
FIG. 4 is top view of the machine of FIG. 1.

As shown best in FIGS. 2 and 3, a movable anvil 50 having a flat surface 52 is affixed to follower surface 42. A non-movable anvil 54 is affixed to base 12 through an alignment assembly 58 in a manner to be described shortly. Anvil surfaces 52 and 56 are made as flat as possible or are so configured that all facing topographical points on the respective anvil surfaces during rest or any movement therebetween remain parallel. In practice, the anvil surfaces are flat and parallel, and remain so because of the parallelogram construction of flexure assembly 26.

Alignment assembly 58 comprises a trivet plate 60 which is supported on base 12 by three adjustable ball supports 62. Ball supports 62 have screws or bolts 63 which are threadedly engaged with plate 60. A turnbuckle 64 (see FIG. 3) extends through a hole 66 in plate 60 and is secured at its opposed ends respectively to non-movable anvil 54 and to base 12. Anvil 54 is made larger than plate hole 66, so that a turning of the turnbuckle will clamp anvil 54 in position with respect to base 12. Before such clamping, however, the screws of ball supports 62 are individually adjusted so that non-movable anvil surface 56 will be parallely disposed with respect to movable anvil surface 52. After the adjustment is completed, turnbuckle 64 is screwed to clamp the parallel adjustment in place.

Cam 44 is configured so that its smallest radius will maintain a spacing between anvil surfaces 52 and 56. This feature is important, in order to prevent movable anvil 50 from striking and damaging surface 52 of non-movable anvil 54, if the former anvil is dropped.

In operation, the operator of machine 10 lifts movable anvil 50 by turning cam 44 through knob 48 and cam shaft 46. Because of the gravitational contact between follower 38 and the cam, the follower and attached movable anvil 50 are raised as a unit with respect to non-movable anvil 54 and, therefore, increases the gap between anvil surfaces 52 and 56. Further, because of the parallelogram configuration of flexure assembly 26, the anvil surfaces remain parallel to one another. The operator then places a specimen, such as a gage or product, in the gap between the anvil surfaces, and gently lowers the movable anvil to bring the gage or the product into contact with both surfaces 52 and 56. This movement is linearly followed by transducer shaft 24 in a corresponding manner, so that displacement transducer 22 can measure the dimension of the gage or product.

Repeated tests using gage block references standards have demonstrated that the present invention can be operated with repeated accuracy to within ±2 microinches (0.05 microns), as demonstrated by use of both a laser interferometer and an electro-optical scale type length transducer. Accordingly, the present invention can be used in place of supermicrometer and vertical motor driven ram contact machines.

Although the invention has been described with respect to a particular embodiment thereof, it should be realized that various changes and modifications may be made therein without departing from the scope of the invention.

What is claimed is:

1. A fast contact measuring machine comprising:
a base;
an anvil fixed to said base and having a surface of given topography;
a movable anvil having a surface of given topography, said movable anvil surface facing said fixed anvil surface and spaced therefrom at an initial gap;
means for establishing the initial gap and gaps greater than the initial gap between said anvil surfaces;
means for supporting said movable anvil on said base, for providing movement of said movable anvil with respect to said fixed anvil, and for maintaining parallelism between all facing topographical points on said respective anvil surfaces during the movement; and
means coupled to said movable anvil for measuring specific ones of the gaps;
said anvil movement providing means and said gap establishing means collectively including a cam rotatably mounted on said base, and a follower contacting said cam and secured both to said movable anvil and to said movable anvil retainer.

2. A fast contact measuring machine comprising:
a base;
an anvil fixed to said base and having a surface of given topography;
a movable anvil having a surface of given topography, said movable anvil surface facing said fixed anvil surface and spaced therefrom at an initial gap;
means for establishing the initial gap and gaps greater than the initial gap between said anvil surfaces;
means for supporting said movable anvil on said base, for providing movement of said movable anvil with respect to said fixed anvil, and for maintaining parallelism between all facing topographical points on said respective anvil surfaces during the movement; and
means coupled to said movable anvil for measuring specific ones of the gaps;
said anvil movement providing means and said gap establishing means collectively including a cam rotatably mounted on said base, and a follower contacting said cam and secured to said movable anvil.

3. A contact measuring machine according to claim 2 in which said supporting means comprises a pair of spring retainers respectively secured to said base and to said movable anvil, a pair of struts positioned between said retainers, and spring flexures respectively coupling said retainers to said struts.

4. A fast contact measuring machine comprising:
a base;
an anvil fixed to said base and having a surface of given topography;
a movable anvil having a surface of given topography, said movable anvil surface facing said fixed anvil surface and spaced therefrom at an initial gap;
means for establishing the initial gap and gaps greater than the initial gap between said anvil surfaces;
supporting means including a support secured to said base, a first spring retainer secured to said support, a second spring retainer secured to said movable anvil, a pair of struts parallely positioned between said retainers, and spring flexure strips respectively coupling said retainers to said struts for supporting said movable anvil on said base, for providing movement of said movable anvil with respect to said fixed anvil, and for maintaining parallelism between all facing topographical points on said respective anvil surfaces during the movement; and
means coupled to said movable anvil for measuring specific ones of the gaps;
said anvil movement providing means and said gap establishing means collectively including a cam rotatably mounted on said base and a follower which is secured both to said movable anvil and to said movable anvil retainer and which is in contact with said cam.

5. A fast contact measuring machine comprising:

a base;

an anvil fixed to said base and having a surface of given togography;

a movable anvil having a surface of given topography, said movable anvil surface facing said fixed anvil surface and spaced therefrom at an initial gap;

means for establishing the initial gap and gaps greater than the initial gap between said anvil surfaces;

means for supporting said movable anvil with respect to said fixed anvil, and for maintaining parallelism between all facing topographical points on said respective anvil surfaces during the movement;

means coupled to said movable anvil for measuring specific ones of the gaps; and an alignment mechanism secured between said fixed anvil and said base for enabling tilting of said fixed anvil surface with respect to said base and, thereby, for effecting the parallelism between all facing topographical points on said respective anvil surfaces.

6. A fast contact measuring machine comprising:

a base;

an anvil fixed to said base and having a flat surface;

a movable anvil having a flat surface facing said fixed anvil surface and parallely spaced therefrom at an initial gap;

a support secured to said base;

a first spring retainer secured to said support, a second spring retainer secured to said movable anvil and spaced from said base, a pair of struts parallely positioned between said retainers, and spring flexure strips respectively coupling said retainers to said struts, for supporting said movable anvil on said base, for enabling parallel movement of said movable anvil with respect to said fixed anvil, and for maintaining parallelism between said respective anvil surfaces during the movement;

a cam rotatably mounted on said base;

a follower secured both to said movable anvil and to said movable anvil retainer, and contacting said cam for establishing the initial gap and gaps greater than the initial gap between said anvil surfaces; and a displacement transducer coupled to said follower and thus to said movable anvil for measuring specific ones of the gaps when a specimen is placed between and in contact with said anvil surfaces.

7. A contact measuring machine according to claim 6 further comprising an alignment mechanism secured between said fixed anvil and said base for enabling tilting of said fixed anvil surface with respect to said base and thereby for establishing the parallelism between said respective anvil surfaces.

8. A contact measuring machine according to claim 7 in which said alignment mechanism comprises a trivet resting on said base by adjustable ball and screw supports and means for securing said trivet to said base under tension.

9. A contact measuring machine according to claim 8 in which said tension securing means comprises a turnbuckle secured respectively to said base and to said trivet.

* * * * *